March 31, 1953  J. W. WENGER ET AL  2,633,091
PELLET MILL

Filed April 17, 1950  2 SHEETS—SHEET 1

INVENTORS
Joseph W. Wenger
BY Louis Wenger
Hamilton & Hamilton
Attorneys.

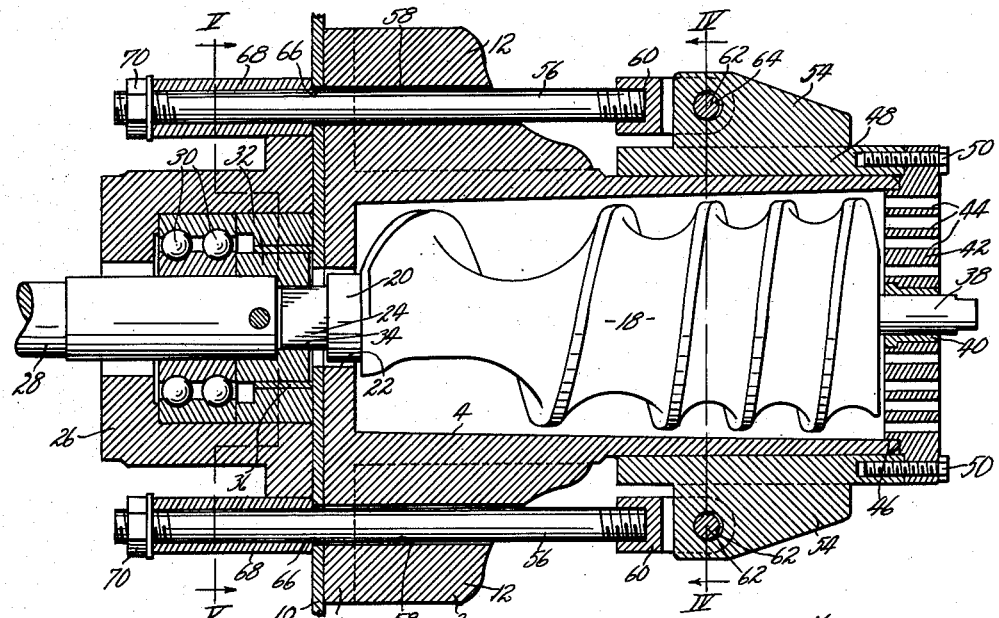

Patented Mar. 31, 1953

2,633,091

UNITED STATES PATENT OFFICE 2,633,091

PELLET MILL

Joseph W. Wenger and Louis Wenger, Sabetha, Kans.

Application April 17, 1950, Serial No. 156,300

4 Claims. (Cl. 107—14)

This invention relates to new and useful improvements in pellet mills, and has particular reference to pellet mills of the type adapted to produce pellets for stock feeding purposes.

In producing stock feed pellets, it is common practice to mix various flours, meals, and other dry feed in powdered or granular form, with molasses to form a plastic mix, and to extrude said mix through a die plate to form pellets. Such pellets have the advantages of putting molasses, which has high nutritive value, in a readily feedable form, preserving a uniform feed by preventing separation or segregation of the dry feeds, and preventing loss of powdered constituents in the form of dust. Machines for producing such pellets normally comprise a perforated die plate and pressure means, ordinarily power driven, for forcing the plastic mix through the perforations of said die plate. A common source of trouble is that when for some reason a quantity of hardened or dry mix enters the machine, it cannot pass through the die plate, and breakage of the machine results. The principal object of the present invention is, therefore, the provision of a pellet mill of the class described having means for preventing damage as a result of the presence of dry or hardened feed.

Another object is the provision of a pellet mill of the class described comprising a hollow body member having a die plate secured releasably thereto and an auger for forcing a feed mix outwardly through perforations formed in said die plate, said die plate being yieldably movable away from said body member whenever the pressure thereagainst exceeds a predetermined high level. This prevents damage by providing a relatively unrestricted outlet for the feed mix, and also provides that the auger may continue to turn to clear the machine of the dry or hardened portion and thus permit continued operation.

Other objects are simplicity and economy of structure, efficiency and dependability and adaptability for use with various materials other than feed mixes.

With these objects in view, as well as other objects which will appear in the course of the specification, reference will be had to the drawings, wherein:

Figure 3 is an enlarged section taken on line III—III of Fig. 1, with parts left in elevation.

Figure 4 is a section taken on line IV—IV of Fig. 3.

Figure 5 is a section taken on line V—V of Fig. 3.

Figures 1, 2:
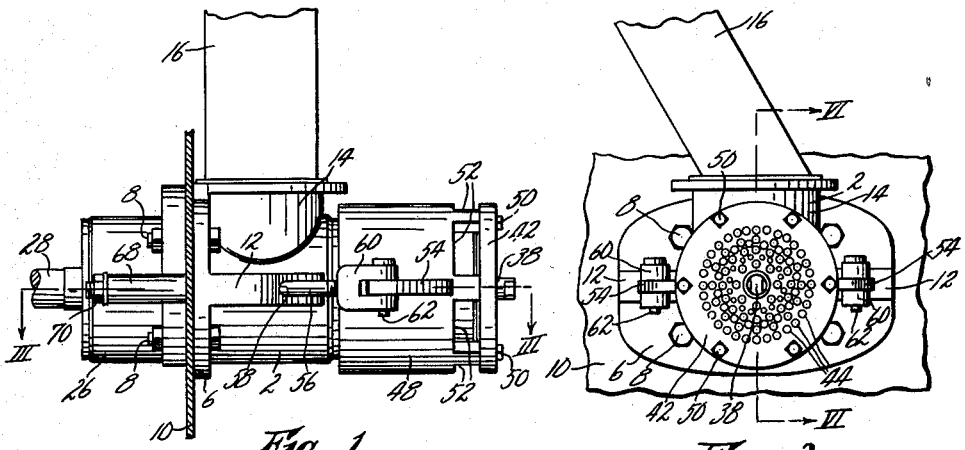
Figure 1 is a side elevation of a pellet mill embodying the present invention, with portions of associated parts shown fragmentarily.
Figure 2 is a front elevation of the device as shown in Fig. 1.

Like reference numerals apply to similar parts throughout the several views, and the numeral 2 applies to a substantially cylindrical hollow body member which is disposed horizontally and the internal bore 4 of which is taperingly enlarged toward the forward end thereof. Said body member is open at its forward end, and is provided at its rearward end with a planar base 6 disposed at right angles to the axis thereof. Said base extends outwardly from the body member to form a flange which is secured by bolts 8 to a vertical structural member such as wall 10. Said wall may conveniently be a portion of the mixing machine in which the pellet mix is prepared, but is not necessarily so. Body member 2 is braced by a pair of opposite webs 12 extending between base 6 and the cylindrical portion of the body member, and lying in the horizontal axial plane of said body member. The pellet mix enters the body member through an upwardly extending inlet passage 14 adjacent the rearward end of said body member, said inlet passage communicating with a chute 16 which in turn communicates with a mixing machine, not shown, in which the plastic mix for forming the pellets is prepared.

Figure 6:
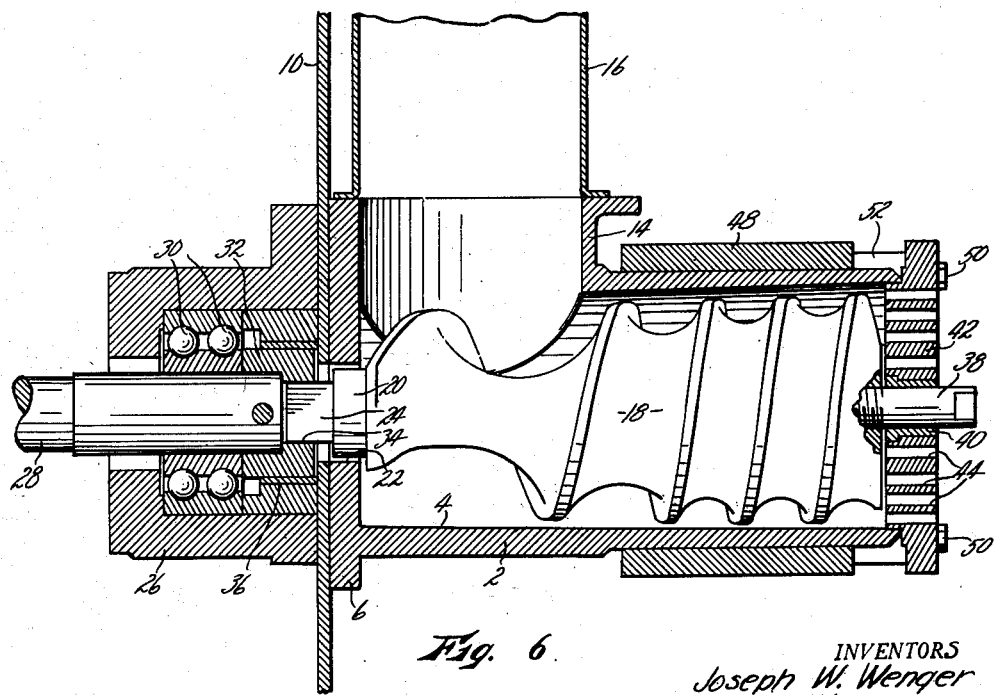
Figure 6 is an enlarged section taken on line VI—VI of Fig. 2, with parts left in elevation.

An auger 18 is disposed axially within body member 2. It will be noted in Figs. 3 and 6 that the pitch of said auger is graduated, being greater at the rearward end than at the forward end. Said auger is tapered to correspond with the taper of the bore 4 of the body member, and there is a substantial clearance between said auger and said bore. At its rearward end, the auger has a hub 20 which projects through a hole 22 formed through base 6 of the body member and wall 10, and is formed at its outer end to present a squared lug 24.

Fixed to the side of wall 10 opposite body member 2, by means of bolts 8, is a bearing housing 26. A drive shaft 28 extends into said housing coaxially with body member 2, and is rotatably supported by a ball bearing 30 carried in said housing. The drive shaft may be driven by any suitable power means, not shown. Fixed to the end of said drive shaft within housing 26 is an adapter 32 provided with a squared recess 34 for receiving lug 24 of the auger, whereby said auger will be rotated. Adapter 32 is carried rotatably in a bushing 36.

A stub shaft 38 is fixed in the forward end of auger 18 coaxially therewith. Said stub shaft is carried rotatably in a bushing 40 fixed centrally in a circular die plate 42. Said die plate has perforations 44 formed therethrough parallel with the axis of the body member, and is positioned to cover the forward end of body member 2. It is of larger diameter than body member 2, but is provided with a portion 46 of a smaller diameter adapted to fit slidably within bore 4. A cylindrical sleeve 48 is carried for longitudinal sliding movement on the external surface of body member 2 and is rigidly secured at its forward end to the edge portion of die plate 42 by means of screws 50. A plurality of circumferentially spaced notches 52 are formed in the forward edge of sleeve 48. An outwardly extending ear 54 is formed integrally with sleeve 48 at each side thereof. A pair of tie-rods 56 are disposed respectively along opposite sides of body member 2 parallel with the axis thereof and are carried for longitudinal movement in bores 58 formed in webs 12 of the body member. A clevis 60 is rigidly attached to the forward end of each of said tie-rods and a headed shear pin 62 is removably inserted through the arms of said clevis and through a hole 64 provided therefor in the associated ear 54. As best shown in Fig. 4, each of shear pins 62 is provided with circumferential grooves 64 which weaken said pin in its planes of shear. Each of said tie-rods extends rearwardly through a hole 66 provided in wall 10, thence through spacer sleeve 68, and is threaded at its rearward end to receive a nut 70.

The operation of the pellet mill is substantially as follows:

The plastic pellet mix, which as previously described ordinarily comprises dry feeds mixed with a molasses, is supplied to the mill through chute 16 and enters bore 4 of the body member through inlet passage 14. Auger 18 being rotated by shaft 28 forces said mix forwardly through body member. The forwardly decreasing pitch of said auger causes said mix to be compressed into a compact mass as it is moved forwardly through the body member thereby insuring that a substantially solid mass may be delivered to die plate 42. This compression is also aided by the fact that the root diameter of the auger increases toward the forward end thereof. As the mix becomes compressed to a substantially solid state, the internal pressure thereof will cause it to be squeezed or forced between the auger and bore 4, the clearance between said bore and said auger being sufficient for this purpose. This action provides a further mixing of the ingredients and provides further insurance of a truly homogenous product.

As the compressed mix reaches die plate 42 it will be forced through perforations 44 thereof in the form of rods or pencils. When said rods or pencils have been extended past the outer face of the die plate a sufficient distance, they will break of their own weight to form pellets of a more or less uniform length, or auxiliary means, not shown, could be furnished for cutting off the pellets at a definitely predetermined length. As the pellets fall from die plate 42, they are customarily passed through suitable dusters, heaters, and dryers, prior to packing and storage, but these devices form no part of the present invention.

In the event of long periods of disuse, a quantity of mix may harden within the body member or said body member may receive a slug of dry feed due to failure of the supply of molasses or other causes. Whatever the cause, this results in an undue strain on the machine since the pellet mix does not then have sufficient fluidity to pass through the die plate, and stalling or breakage would result were means not provided for preventing this result. The mounting of die plate 42 on sleeve 48 which is slidable on body member 2, and the retention of said sleeve by tie-rods 56 and shear pins 62 provide this preventive means. Whenever the pressure against inner face of shear plate 42 exceeds a predetermined high level, pins 62 will be sheared. The internal pressure on die plate 42 will then cause said plate to be moved forwardly away from the end of body member 2, sleeve 48 sliding forwardly on body member 2. The dry or hardened pellet mix will then be forced upwardly through the resultant annular space between the body member and the edge of die plate 42, and outwardly through notches 52 of sleeve 48. It will be noted that this is a distinct improvement over devices wherein shear pins are responsive to overload conditions to stop the rotation of the auger. In such devices the dry or hardened mix is left within the mill, which must then be disassembled and cleaned before the device can be again placed in operation. In the present device however the auger continues to rotate, and functions to eject the dried or hardened mix immediately and with no necessity for disassembly of the device. It will be noted that die plate 42 is maintained accurately in axial alignment with the body member by the engagement of sleeve 48 on said body member, thereby maintaining a proper bearing for shaft 38 of the auger.

When it is desired to place the machine in operation again sleeve 48 is pushed rearwardly until the die plate engages the forward end of body member 2. Nuts 70 are loosened and tie-rods 56 are moved forwardly to bring clevises 60 into alignment with hole 64 of ears 54 to permit insertion of new shear pins 62. After said new shear pins have been inserted nuts 70 are tightened to urge die plate 42 against the forward end of the body member with the desired tension.

Although we have shown and described a specific embodiment of our invention, it is apparent that many minor modifications of construction and operation could be made without departing from the spirit of the invention.

What we claim as new, and desire to protect by Letters Patent is:

1. A pellet mill for producing pellets from a plastic mix comprising a substantially tubular body member open at one end and having an inlet opening adjacent the opposite end thereof, a cylindrical sleeve carried slidably on the outer surface of said body member at the open end thereof, a perforated die plate fixed to the outer end of said sleeve and covering the open end of said body member, said die plate being adapted by the movement of said sleeve to be moved to and from a position against the open end of said body member, said sleeve having apertures formed therein adjacent said die plate, said apertures forming a relatively unrestricted outlet from said body member when said die plate is moved outwardly from said body member, an operably driven auger carried axially in said body member and adapted to force pellet mix outwardly through said die plate, and means for securing said sleeve to maintain said die plate against said body member, said securing means being adapted to yield whenever pressure against said die plate exceeds a predetermined high level.

2. A pellet mill for producing pellets from a plastic mix comprising a substantially tubular body member open at one end and having an inlet opening adjacent the opposite end thereof, a cylindrical sleeve carried slidably on the outer surface of said body member at the open end thereof, a perforated die plate fixed to the outer end of said sleeve and covering the open end of said body member, said die plate being adapted by the movement of said sleeve to be moved to and from a position against the open end of said body member, said sleeve having apertures formed therein adjacent said die plate, said apertures forming a relatively unrestricted outlet from said body member when said die plate is moved outwardly from said body member, an operably driven auger carried axially in said body member and adapted to force pellet mix outwardly through said die plate, said auger being supported at one end by an axial shaft carried for rotation and longitudinal movement in a bearing carried centrally in said die plate, and means for securing said sleeve to maintain said die plate against said body member, said securing means being adapted to yield whenever pressure against said die plate exceeds a predetermined high level.

3. A pellet mill for producing pellets from a plastic mix comprising a substantially tubular body member open at one end and having an inlet opening adjacent the opposite end thereof, a cylindrical sleeve carried slidably on the outer surface of said body member at the open end thereof, a perforated die plate fixed to the outer end of said sleeve and covering the open end of said body member, said die plate being adapted by the movement of said sleeve to be moved to and from a position against the open end of said body member, said sleeve having apertures formed therein adjacent said die plate, said apertures forming a relatively unrestricted outlet from said body member when said die plate is moved outwardly from said body member, an operably driven auger carried axially in said body member and adapted to force pellet mix outwardly through said die plate, said auger being supported at one end by an axial shaft carried for rotation and longitudinal movement in a bearing carried centrally in said die plate, and shear pins adapted to secure said sleeve against movement relative to said body member to maintain said die plate against said body member, said shear pins being adapted to yield whenever the pressure against said die plate exceeds a predetermined high level.

4. A pellet mill for producing pellets from a plastic mix comprising a substantially tubular body member open at one end and having an inlet opening adjacent the opposite end thereof, a cylindrical sleeve carried slidably on the outer surface of said body member at the open end thereof, a perforated die plate fixed to the outer end of said sleeve and covering the open end of said body member, said die plate being adapted by the movement of said sleeve to be moved to and from a position against the open end of said body member, said sleeve having apertures formed therein adjacent said die plate, said apertures forming a relatively unrestricted outlet from said body member when said die plate is moved outwardly from said body member, an operably driven auger carried axially in said body member and adapted to force pellet mix outwardly through said die plate, said auger being supported at one end by an axial shaft carried for rotation and longitudinal movement in a bearing carried centrally in said die plate, a plurality of tie-rods carried by said body member for adjustable movement relative to the axis thereof, and a shear pin connecting each of said tie-rods to said sleeve, whereby said die plate is urged firmly against the end of said body member, said shear pins being adapted to shear whenever pressure thereagainst exceeds a predetermined high level.

JOSEPH W. WENGER.
LOUIS WENGER.

REFERENCES CITED

The following references are of record in the file of this patent:

UNITED STATES PATENTS

| Number | Name | Date |
|---|---|---|
| 207,343 | Chambers | Aug. 27, 1878 |
| 1,221,054 | Hyatt | Apr. 3, 1917 |
| 1,925,010 | Sizer | Aug. 29, 1933 |
| 2,007,104 | Zwart | July 2, 1935 |
| 2,020,510 | Meakin | Nov. 12, 1935 |